United States Patent [19]

Kranz et al.

[11] 4,255,203

[45] Mar. 10, 1981

[54] PIGMENT FORMULATIONS

[75] Inventors: Joachim Kranz, Ludwigshafen; Reinhard Sappok, Heidelberg, both of Fed. Rep. of Germany

[73] Assignee: BASF Aktiengesellschaft, Ludwigshafen, Fed. Rep. of Germany

[21] Appl. No.: 116,384

[22] Filed: Jan. 29, 1980

[51] Int. Cl.³ .................................................. C09C 3/02
[52] U.S. Cl. .............................. 106/288 Q; 106/308 N
[58] Field of Search ........................ 106/288 Q, 308 N

[56] References Cited

U.S. PATENT DOCUMENTS

| | | | |
|---|---|---|---|
| 3,560,235 | 2/1971 | Sarfas et al. | 106/308 N |
| 4,042,413 | 8/1977 | Hauxwell et al. | 106/308 N |
| 4,119,478 | 10/1978 | Robertson | 106/308 N |
| 4,129,455 | 12/1978 | Thompson et al. | 106/308 N |
| 4,157,266 | 6/1979 | Hauxwell et al. | 106/308 N |

FOREIGN PATENT DOCUMENTS 1486022  9/1977  United Kingdom ................ 106/288 Q

*Primary Examiner*—James Poer
*Attorney, Agent, or Firm*—Oblon, Fisher, Spivak, McClelland & Maier

[57] ABSTRACT

A pigment formulation which comprises (a) a finely divided organic pigment and (b) one or more urea derivatives of the formula $K\text{-}(NH\text{-}CO\text{-}NH\text{-}R)_2$, where R is $C_{12}$-$C_{18}$-alkyl, $C_{12}$-$C_{18}$-alkenyl, $C_8$-$C_{18}$-alkoxypropyl or $-(CH_2)_3-O-(C_2H_4O)_n-R^1$, $R^1$ is $C_2$-$C_8$-alkyl or phenyl, n is 1, 2, 3 or 4 and K is 1,5-naphthylene or 4,4'-diphenylenemethane, with or without (c) up to 5% by weight, based on (a and b), of agents conventionally present in pigment formulations.

In binder solutions, the pigment formulations give printing inks and paints possessing excellent tinctorial properties.

Some of the compounds (b) prevent the conversion of α-copper phthalocyanine to the β-modification.

14 Claims, No Drawings

PIGMENT FORMULATIONS

The present invention relates to novel pigment formulations which exhibit improved use characteristics, such as improved gloss and flow and high tinctorial strength.

Printing inks and paints are pigment dispersions containing binders and other assistants. The rheological characteristics of these inks are substantially determined by the pigment. For example, in viscous, thick inks or paints, which are virtually no longer capable of flow, or are thixotropic, the pigment or pigments are substantially or virtually completely present in a flocculated form. Such inks or paints not only have poor flow but also give pale colorations which are less glossy than those obtained with inks or paints in which the pigment is not flocculated.

It is true that inks or paints which are easier to use can be obtained if the pigment content is reduced. However, in many cases this is undesirable.

The literature discloses a number of additives for pigments which allegedly reduce or even completely prevent pigment flocculation in printing inks and paints. For example, German Published Application DAS No. 1,767,822 describes pigment formulations which in addition to the pigment contain a virtually colorless compound. The latter carries one or more urea or urethane groups and one or more basic, preferably tertiary, amino groups not directly bonded to an aromatic nuclues. The colorless compounds are obtained by reacting isocyanates, especially diisocyanates, with aminoalcohols, polyamines or, preferably, diamines; the amino group in the aminoalcohols, or one of the amino groups in the polyamines and diamines, should preferably be tertiary.

German Laid-Open Application DOS No. 2,701,292 discloses pigment formulations which impart improved rheological properties to inks and paints, and increased gloss and greater depth to the colorations obtained with these inks or paints. In addition to the pigments, the formulations contain one or more colorless compounds which possess one or more basic nitrogen atoms on a pyridine or benzimidazole system and one or more urea groups and/or urethane groups. These colorless additives are prepared by reacting diisocyanates with monofunctional or bifunctional amino derivatives or hydroxy derivatives of a pyridine or benzimidazole compound, in the presence or absence of additional mono- or dihydroxy/amino compounds which do not contain any basic heterocyclic nitrogen atoms.

It is an object of the present invention to provide pigment formulations which when used in printing inks and paints are superior to the prior art pigment formulations in respect to the resulting flow, depth of color and gloss.

We have found that pigment formulations which contain
(a) a finely divided organic pigment and
(b) one or more urea derivatives of the formula $$K+NH-CO-NH-R)_2 \qquad I$$

where R is $C_{12}-C_{18}$-alkyl, $C_{12}-C_{18}$-alkenyl, $C_8-C_{18}$-alkoxypropyl or $-(CH_2)_3-O-(C_2H_4O)_n-R^1$, where $R^1$ is $C_2-C_8$-alkyl or phenyl and n is 1, 2, 3 or 4, and K is 1,5-naphthylene or 4,4'-diphenylenemethane, give printing inks and paints having excellent tinctorial properties.

For example, toluene-based gravure printing inks prepared with pigment formulations according to the invention exhibit substantially or distinctly improved flow, so that such printing inks can be prepared with a higher content of pigment whilst still possessing excellent flow. Furthermore, the toluene-based gravure inks prepared with the pigment formulations according to the invention give deep, very glossy colorations. In baking finishes, the colorations obtained are deeper, have a slightly or substantially purer hue, and exhibit higher gloss, than colorations obtained with the same pigment without (b).

The formulations according to the invention can be obtained by mixing the finely divided pigment with the urea derivative of the formula I (=additive (b)), for example by milling. The formulation can also be prepared by conditioning the crude pigment in the presence of the additive (b), or by conjointly grinding the pigment and the additive (b) in a suitable binder or binder solution for printing inks and/or paints. In every case, the same advantageous effects are achieved.

The amount of (b) depends on the nature of the pigment (a) and of the additive (b). As a rule, it is from about 2% by weight to 20% by weight, based on (a), preferably from 5 to 15% by weight, based on (a). Amounts of (b) of from 7 to 10% by weight, based on (a), are especially preferred, since they give optimum effects.

It is also possible to use (b) in amounts greater than 20% by weight, based on (a), but such large amounts offer no further advantages. Advantageously, the amount of (b) is such as to give the optimum effect.

In the case of the copper phthalocyanines, for example, optimum effects are achieved with from 7 to 10% by weight of (b), based on pigment.

With pigments derived from flavanthrone, perylene-3,4,9,10-tetracarboxylic acid bis-phenylimides, where phenyl may be substituted, for example by $C_1-C_4$-alkyl, chlorine, bromine, methoxy or ethoxy, indanthrone and its chlorine derivatives, pyranthrone and its chlorine and/or bromine derivatives, and insoluble colorants based on anthraquinone, optimum results are as a rule achieved with amounts of from 5 to 15%, based on pigment (a).

Suitable additives (b) are the urea derivatives of the formula I. In these, K is 4,4'-diphenylenemethane or preferably 1,5-naphthylene.

Specific examples of R are:

(α) $R = C_{12}-C_{20}$-alkyl or $C_{12}-C_{20}$-alkenyl; dodecyl, isododecyl, tridecyl, tetradecyl, hexadecyl, octadecyl and oleyl.

(β) $R = C_8-C_{18}$-alkoxypropyl: 3-(2'-ethylhexyloxy)-propyl, 3-(n-octyloxy)-propyl, 3-nonyloxypropyl, 3-decyloxypropyl, 3-undecyloxypropyl, 3-dodecyloxypropyl, 3-tridecyloxypropyl, 3-tetradecyloxypropyl, 3-pentadecyloxypropyl, 3-hexadecyloxypropyl and 3-octadecyloxypropyl.

(γ) $R = -(CH_2)_3-O-(C_2H_4O)_n-R^1$, where $R^1$ is $C_2-C_8$-alkyl or phenyl and n is 1, 2, 3 or 4:

$$-CH_2-CH_2-CH_2-O-CH_2-CH_2-OR^1,$$

$$-CH_2-CH_2-CH_2-O-(CH_2-CH_2O)_2-R^1,$$

$$-CH_2-CH_2-CH_2-O-(CH_2-CH_2O)_3-R^1 \text{ and}$$

$$-CH_2-CH_2-CH_2-O-(CH_2-CH_2O)_4-R^1$$

where $R^1$ is ethyl, n-propyl, isopropyl, n-butyl, isobutyl, pentyl, hexyl, octyl, 2ethylhexyl or phenyl.

Amongst the radicals R mentioned under ($\gamma$), those where $R^1$ is $C_2$–$C_5$-alkyl or phenyl and n is 1, 2 or 3 are preferred.

Preferred formulations contain compounds of the formula I where K is 1,5-naphthylene and R is ($\alpha'$) $C_{13}$–$C_{18}$-alkyl, eg. tridecyl, tetradecyl, hexadecyl or octadecyl, or oleyl, ($\beta'$) 3-($C_8$–$C_{18}$-alkoxy)-propyl, for example the groups mentioned specifically above under ($\beta$), as well as 3-($C_9$/$C_{11}$-alkoxy)-propyl, 3-($C_{12}$/$C_{14}$-alkoxy)-propyl and 3-($C_{16}$/$C_{19}$-alkoxy)-propyl, or ($\gamma'$) —$(CH_2)_3$—O—$(CH_2$—$CH_2O)_m$—$R^2$ where m is 2 or 3 and $R^2$ is ethyl, n-propyl, n-butyl or phenyl, since these formulations give printing inks which have particularly advantageous flow properties and result in prints with particularly high gloss.

Very particularly preferred formulations are those which contain, as (b), compounds of the formula I where K is 1,5-naphthylene and R is tridecyl, 3-(2'-ethylhexyloxy)-propyl or —$(CH_2)_3$—O—$(C_2H_4O)$-$_2$—$(CH_2)_3$—$CH_3$.

Suitable organic pigments are those based on anthraquinone and fused ring systems derived therefrom, on perylene-3,4,9,10-tetracarboxylic acid or its diimide, on quinophthalones, dioxazines or quinacridone, and on phthalocyanine. Specific examples are flavanthrone, indanthrone and its chlorination products containing from 1 to 4 chlorine atoms, pyranthrone, dichloropyranthrone, monobromo- and dibromo-dichloropyranthrone, tetrabromopyranthrone, perylene-3,4,9,10-tetracarboxylic acid diimides, wherein the imide groups may be unsubstituted or substituted by $C_1$–$C_3$-alkyl, phenyl or heterocyclic radicals, and wherein the phenyl and heterocyclic radicals may additionally carry substituents which do not confer solubility in water, anthrapyrimidinecarboxylic acid amides, violanthrone, isoviolanthrone, dioxazine pigments, copper phthalocyanines which may contain up to 2 chlorine atoms per molecule, polychloro-copper phthalocyanines and polybromochloro-copper phthalocyanines of up to 14 bromine atoms.

Some of the compounds of the formula I stabilize $\alpha$-copper phthalocyanines against a change of modification and protect copper phthalocyanine pigments, in systems containing aromatic hydrocarbons, against further crystallization. Hence, using such formulations it is possible to prepare, for example, paints containing $\alpha$-copper phthalocyanine pigments which would otherwise not be stable since the $\alpha$-copper phthalocyanine would recrystallize to long needles of the $\beta$-modification.

Particularly suitable formulations for stabilizing $\alpha$-copper phthalocyanines are those wherein (b) is a compound of the formula

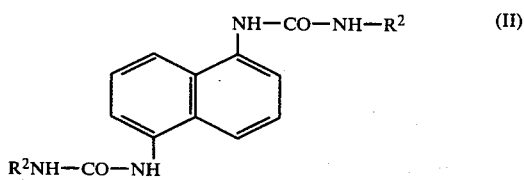

(II)

where $R^2$ is $C_8$–$C_{10}$-alkyl, $C_{13}$–$C_{18}$-alkyl or 3-($C_8$–$C_{18}$-alkoxy)-propyl.

Preferred compounds (b) for stabilizing $\alpha$-copper phthalocyanines are those of the formula II, where $R^2$ is 2-ethylhexyl, n-octyl, decyl, tridecyl, tetradecyl, hexadecyl, octadecyl, 3-(2'-ethylhexyloxy)-propyl, 3-octyloxy-propyl, 3-decyloxypropyl, 3-tridecyloxypropyl, 3-hexadecyloxypropyl or 3-octadecyloxypropyl.

If a formulation containing $\alpha$-copper phthalocyanine and the compound of the formula II, where $R^2$ is 2-ethylhexyl, in toluene is boiled for 2 hours, the $\alpha$-copper phthalocyanine is not converted to the $\beta$-modification.

In addition to (a) and (b), the formulations according to the present invention may or may not contain other ingredients (c), conventionally used in pigment formulations, eg. wetting agents, dust-suppressing agents and the like. The amount of such ingredients should be kept as low as possible and should not exceed 5% by weight, based on (a+b). Preferably the proportion of (c) is less than 1% by weight, in particular less than 0.2% by weight, based on (a+b).

The examples which follow illustrate the present invention. The percentages are by weight.

To test the formulations, printing inks and baking finishes were prepared as follows:

(A) Toluene-based gravure printing ink (A1) The amount of formulation corresponding to 12 g of pigment is added to 138 g of a 35% strength solution of a printing ink binder, based on a phenol-formaldehyde condensate, in a 250 ml polyethylene beaker, and after adding 300 g of glass beads (3–4 mm $\phi$) the mixture is shaken on a ®RED DEVIL shaking mill for 5 minutes. This product constitutes ink 1.

(A2) The procedure described for (A1) is followed, except that the batch is shaken for 30 minutes. The product is ink 3.

(A3) (Comparison) The procedure followed is as described for (A1), except that 12 g of the pigment contained in the formulation (ie. the pigment without b)) are used. The product is ink 2.

(A4) (Comparison) The procedure described in (A3) is followed, except that the batch is shaken for 30 minutes. The product is ink 4.

The toluene-based gravure printing inks were tested as follows:

(B) Test of toluene-based gravure printing inks (A)

(B1) Viscosity: the viscosity was determined by measuring the flow time from a DIN-4 cup.

(B2) Gloss: the gloss was measured on the colorations obtained, using a Gardner gloss-measuring instrument, at an angle of 45°, against a black glass standard.

The colorations were obtained by applying the gravure printing inks obtained as described in (A) to aluminum foil and polyethylene film, using a 20 $\mu$m spiral coater from Erichsen.

(C) Baking finish (C1) Colored finish: the amount of the formulation corresponding to 5 g of pigment is added to 95 g of a baking finish based on a 35% strength solution of an alkyd/melamine resin in xylene in a 250 ml polyethylene beaker, and after adding 100 ml of glass beads of 3 mm $\phi$ the mixture is shaken on a ®RED DEVIL shaking mill for 60 minutes.

(C2) Full-shade finish: 5 g of colored finish (C1) are mixed with an equal amount of a clear finish based on a 35% strength solution of an alkyd/melamine resin in xylene.

(C3) White reduction: 4 g of colored finish (C1) are mixed with 12.5 g of a white finish containing 40% of titanium dioxide.

(D) Testing the full-shade finish and the white reduction (D1) The full-shade finish (C2) is applied to a contrast chart by means of a 150 μm spiral coater. After air-drying for 20 minutes, the coating is baked for 15 minutes at 120° C.

The coating over the black-and-white contrast stripe or contrast grid is assessed visually for gloss, brilliance and transparency in comparison with corresponding colorations which contain the pigment without additive (b).

(D2) The white reduction (C3) is coated onto cardboard by means of a 150 μm knife coater, and the coating is air-dried for 20 minutes and then baked at 120° C. for 30 minutes. The colorations are evaluated colorimetrically by the FIAF method (L. Gall, Farbe+Lack 75 (1969), 854–862) in respect of tinctorial strength, hue (T) and purity (S). The tinctorial strength was expressed as a color equivalent (CE) taking the comparative coloration (which contains the pigment without additive (b)) as 100.

(D3) Determination of the dispersibility (in a white reduction): The dispersibility is determined using 2 white reduction colorations. One of these is prepared with the colored finish obtained as described in (C1). The coloration obtained with this white reduction has a final strength (F2).

The other white reduction is prepared with a colored finish obtained by the method described in (C1), except that the mixture is only dispersed for 6 minutes in the shaking mill. The white reduction thus obtained has a strength F1.

The dispersibility (D) is calculated from the strengths F1 and F2 by the equation $$D = (F2/F1 - 1) \cdot 100$$

It follows from the equation that the more easily a pigment is dispersible in the particular medium, the lower is the value of D, and vice versa.

EXAMPLE 1

(a) Formulation: 100 g of the flavanthrone pigment prepared as described in (c) are mixed homogeneously, by milling in a coffee mill, with 9 g of a reaction product of 1 mole of 1,5-naphthylene diisocyanate with 2 moles of 3-(2'-ethylhexyloxy)-propylamine.

(b) Toluene-based gravure printing ink: toluene-based gravure printing inks are prepared from (a) by the method of (A1) and (A2), respectively giving ink 1 and ink 3.

For comparison, a toluene-based gravure printing ink was prepared with the pigment obtained according to (c) by methods (A3) and (A4), respectively giving inks 2 and 4.

The toluene-based gravure printing inks were tested as described in (B). The results are summarized in Table 1 below.

|  | Ink 1 | Ink 2 | Ink 3 | Ink 4 |
|---|---|---|---|---|
| Viscosity [sec] | 24 | 32 | 26 | 99 |
| Gloss | | | | |
| aluminum foil | 148 | 135 | 159 | 120 |
| polyethylene film (PE) | 85 | 81 | 104 | 91 |

Virtually the same result is obtained if in (b) 12 g of the flavanthrone pigment prepared as described in (c) and 1.1 g of the reaction product referred to in (a) are added to the binder solution and the mixture is dispersed in the shaking mill.

(c) Preparation of the pigment used: a mixture of 250 kg of crude flavanthrone, 1,500 kg of sodium chloride and 5 kg of trichlorobenzene is milled for 30 hours at 90° C. in a 10 m$^3$ ball mill (filled with 15.5 tones of iron balls of 20–25 mm $\phi$). The milled material is introduced into water, the warm suspension is filtered and the filter residue is washed salt-free and dried.

EXAMPLE 2

(a) The formulation is prepared in the binder.

(b) Toluene-based gravure printing ink: one ink is prepared according to (A1) and another according to (A2), except that 12 g of the milled material obtained according to (c) and 1.1 g of the reaction product of 1 mole of 1,5-napthylene diisocyanate with 2 moles of 3-(2'-ethyylhexyloxy)-propylamine are added to the binder solution and the mixture is the dispersed (the products obtained being inks 1 and 3).

The comparative inks are prepared according to (A3) and (A4), with the milled material obtained according to (c) (the products obtained being inks 2 and 4).

The toluene-based gravure printing inks are tested according to (B). The results are summarized in Table 2.

|  | Ink | | | |
|---|---|---|---|---|
|  | 1 | 2 (Comparison) | 3 | 4 (Comparison) |
| Viscosity [sec] | 24 | 26 | 28 | 98 |
| Gloss | | | | |
| aluminum foil | 111 | 85 | 170 | 122 |
| polyethylene film | 70 | 54 | 111 | 83 |

An equally good result in (b) is obtained if a homogeneous formulation is prepared from the milled material (c) and the bis-urea mentioned in (b) by mixing (cf. Example 1a), whic formulation contains 9%, based on milled material, of the bis-urea, and toluene-based gravure printing inks are then prepared from the formulation in accordance with (A1) and (A2).

(c) Pigment used: 300 kg of crude flavanthrone are milled for 25 hours in a 2 m$^3$ ball mill (containing 3 tones of iron balls of 20 to 25 mm $\phi$). The milled material is used directly.

EXAMPLE 3

(a) Formulation: 100 g of the milled material obtained according to (c) are homogenized with 7.5 g of the reaction product mentioned in Example 1 (a), in a coffee mill.

(b) The toluene-based gravure printing ink is prepared according to (A1) and (A2), using (a), and the comparative inks are prepared according to (A3) and (A4), using the milled material (c).

The inks are tested as described in (B). The results are summarized in Table 3.

Equally good toluene-based gravure printing inks are obtained if the inks are prepared as described in Example 2(b), the amount of bis-urea added being 7.5%, based on the milled material (c).

(c) Pigment used: 300 kg of crude indanthrone are milled for 30 hours in a 2 m³ ball mill (filled with 3 tones of iron balls of 20–25 mm φ). The milled material is then discharged from the mill and is used directly.

EXAMPLE 4

(b) Toluene-based gravure printing inks: an ink is prepared according to (A1) and another according to (A2), except that 12 g of the milled material obtained according to (c) and 0.96 g of the reaction product of 1 mole of 1,5-naphthylene diisocyanate with 2 moles of 3-(2′-ethylhexyloxy)-propylamine are added to the binder solution and the mixture is then dispersed (the products obtained being inks 1 and 3).

The comparative inks are prepared according to (A3) and (A4), using the milled material (c) (the products obtained being inks 2 and 4).

The inks are tested according to (B). The results are summarized in Table 3 under Example 4.

Virtually the same result is achieved if a homogeneous mixture is first prepared from (c) and the reaction product mentioned in (b), and this mixture is used to prepare the printing ink.

(c) 200 kg of crude perylene-3,4,9,10-tetracarboxylic acid bis-N,N′-(4′-ethoxyphenylimide) are milled for 35 hours in a 2 m³ ball mill (filled with 3 tones of iron balls of 20–25 mm φ). The milled material is used directly.

EXAMPLE 5

(a) Formulation: 100 g of Pigment Yellow 108, C.I. No. 68,420, obtained according to (c), are mixed homogeneously with 8.5 g of the reaction product of 1 mole of 1,5-naphthylene diisocyanate with 2 moles of 3-(2′-ethylhexyloxy)-propylamine.

(b) Toluene-based gravure printing innks are prepared with the formulation from (a) according to (A1) and (A2) (products obtained being inks 1 and 3). The comparative inks are prepared from the milled material (c) according to (A3) and (A4) (products obtained being inks 2 and 4).

The inks are tested according to (B). The results are summarized in Table 3 under Example 5.

An equally good result is obtained if the printing ink is prepared by methods similar to Example 4(b).

(c) 300 kg of crude Pigment Yellow 108, C.I. No. 68,420 are milled for 24 hours in a 2 m³ ball mill (filled with 3 tons of iron balls of 20–25 mm φ). The milled material is used directly.

TABLE 3

Results of test on the toluene-based gravure printing inks

| Example | Ink | Viscosity [sec] | Gloss polyethylene film | Gloss aluminum foil |
|---|---|---|---|---|
| 3 | 1 | 22 | 48 | 56 |
|   | 2+ | 27 | 35 | 40 |
|   | 3 | 33 | 78 | 78 |
|   | 4+ | 38 | 59 | 55 |
| 4 | 1 | 27 | 66 | 111 |
|   | 2+ | 34 | 61 | 98 |

-continued

| Example | Ink | Viscosity [sec] | Gloss polyethylene film | Gloss aluminum foil |
|---|---|---|---|---|
|   | 3 | 41 | 93 | 130 |
|   | 4+ | 61 | 85 | 112 |
| 5 | 1 | 20 | 52 | 112 |
|   | 2+ | 21 | 48 | 103 |
|   | 3 | 27 | 91 | 162 |
|   | 4+ | 46 | 81 | 150 |
| 6 | 1 | 22 | 89 | 133 |
|   | 2+ | 26 | 57 | 85 |
|   | 3 | 26 | 105 | 158 |
|   | 4+ | 37 | 79 | 113 |

+Comparison

EXAMPLE 6

(a) Pigment formulation: 5 kg of crude copper phthalocyanine (prepared from o-phthalodinitrile and copper(I) chloride in nitrobenzene) and 0.45 kg of the reaction product of 1,5-naphthylene diisocyanate with 3-(2′-ethylhexyloxy)-propylamine are milled for 25 hours in a 50 liter ball mill (filled with 50 kg of iron balls of 20–30 mm φ).

(b) The toluene-based gravure printing inks are prepared with formulation (a) according to (A1) and (A2) (the products obtained being inks 1 and 3). For comparison, toluene-based gravure printing inks are prepared according to (A3) and (A4) (the products obtained being inks 2 and 4), using, as the pigment, crude copper phthalocyanine milled in the absence of the diisocyanate reaction product.

The inks are tested according to (B). The results are summarized in Table 3 under Example 6.

EXAMPLE 7

(a) Pigment formulation: 100 g of the milled material prepared according to (c) and X g of the compound

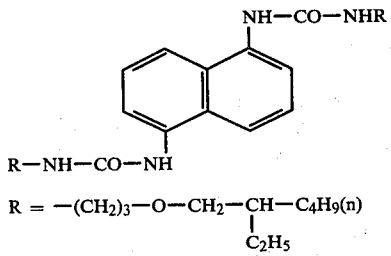

$R = -(CH_2)_3-O-CH_2-\underset{\underset{C_2H_5}{|}}{CH}-C_4H_9(n)$ (=bis-urea), in 400 g of tetrahydrofuran and 300 g of 10% strength sodium chloride solution, are boiled for 5 hours. The tetrahydrofuran is then distilled off, the aqueous suspension is filtered and the filter residue is washed salt-free and dried.

(b) Toluene-based gravure printing inks 1 and 3 are prepared with the formulation (a) according to (A1) and (A2).

For comparison, toluene-based gravure printing inks are prepared according to (A3) and (A4) with a copper phthalocyanine pigment which has been prepared according to (a) but in the absence of the bis-urea (the products obtained being inks 2 and 4).

The printing inks are tested according to (B). The results are summarized in Table 4.

(c) 5 kg of crude copper phthalocyanine (prepared from o-phthalodinitrile and copper(I) chloride by the solvent process) are milled for 25 hours in a ball mill of 50 liters capacity, filled with 50 kg of iron balls of 20–30 mm $\phi$.

EXAMPLES 8 to 10

The procedure followed is as in Example 7, except that the bis-ureas listed in Table 4 are used in the amounts X shown in the Table. The test results are also shown in the Table.

COMPARATIVE EXAMPLES I to V (PRIOR ART)

(a) Pigment formulation I: 100 g of copper phthalocyanine pigment (prepared as described in Example 11(c)) and 9 g of the reaction product, described in Example A of German Laid-Open Application DOS No. 2,701,292, of 2-aminopyridine, ethylene glycol and a mixture of 2,6- and 2,4-toluylene diisocyanate are mixed homogeneously by milling in a coffee mill.

TABLE 4

Bis-urea structure: naphthalene with NHCONHR and R—NH—CO—NH substituents

| Ex. | X [g] | R | Ink | Viscosity [sec] | Gloss PE film | Gloss aluminum foil |
|---|---|---|---|---|---|---|
| 7 | 5 | —(CH$_2$)$_3$—O—CH$_2$—CH(C$_2$H$_5$)—C$_4$H$_9$(n) | 1 | 23 | 93 | 144 |
|  |  |  | 2+ | 28 | 81 | 117 |
|  |  |  | 3 | 30 | 104 | 161 |
|  |  |  | 4+ | 71 | 98 | 140 |
| 8 | 7,5 | —(CH$_2$)$_3$—O—C$_{13}$H$_{27}$ | 1 | 18 | 102 | 157 |
|  |  |  | 2+ | 28 | 81 | 117 |
|  |  |  | 3 | 19 | 111 | 176 |
|  |  |  | 4+ | 71 | 97 | 140 |
| 9 | 7 | —(CH$_2$)$_3$—O—(C$_2$H$_4$O)$_2$—C$_4$H$_9$(n) | 1 | 22 | 109 | 141 |
|  |  |  | 2+ | 28 | 81 | 117 |
|  |  |  | 3 | 26 | 112 | 161 |
|  |  |  | 4+ | 71 | 98 | 140 |
| 10 | 9 | —C$_{13}$H$_{27}$ | 1 | 18 | 95 | 133 |
|  |  |  | 2+ | 28 | 81 | 117 |
|  |  |  | 3 | 20 | 108 | 160 |
|  |  |  | 4+ | 71 | 98 | 140 |

+Comparative experiment (without additive)

EXAMPLE 11

(a) Pigment formulation: 100 g of copper phthalocyanine pigment (prepared as described in (c)) are milled (homogenized) with X g of the bis-urea as shown in Table 5, in a coffee mill.

(b) Using formulation (a), toluene-based gravure printing inks are prepared as described under (A1) and (A2) (the products obtained being inks 1 and 3).

The comparative inks are prepared with the pigment obtained under (c), according to methods (A3) and (A4) (the products obtained being inks 2 and 4).

The printing inks are tested in accordance with the methods described under (B).

The results are summarized in Table 5.

(c) The pigment was prepared as follows: copper phthalocyanine prepared by the solvent process from o-phthalodinitrile and copper(I) chloride is milled with a 10-fold amount by weight of sodium chloride, in the presence of 2%, based on copper phthalocyanine, of trichlorobenzene, for 25 hours in a ball mill. The milled material is introduced into water, the pigment suspension is filtered warm, and the filter residue is washed salt-free and dried.

EXAMPLES 12 to 15

The procedure followed is as in Example 11, except that the bis-ureas listed in Table 5 are used in the amounts X shown in the Table. The test results on the toluene-based gravure printing inks obtained are also shown in the Table.

Pigment formulation II is prepared like formulation I, except that 9 g of the reaction product, described in Example B of German Laid-Open Application DOS No. 2,701,292, of 2-aminopyridine, ethylenediamine and a mixture of 2,4- and 2,6-toluylene diisocyanate are used as the additive.

Pigment formulation III is prepared like formulation I, except that 9 g of the reaction product, described in Example D of German Laid-Open Application DOS No. 2,701,292, of 2-aminobenzimidazole, ethylene glycol and a mixture of 2,4- and 2,6-toluylene diisocyanate is used as the additive.

Pigment formulation IV is prepared like formulation I, except that 9 g of the condensate, described in Example 1 of German Published Application DAS No. 1,767,822, of ethylenediamine, 3-dimethylaminopropylamine and toluylene diisocyanate is used as the additive.

Pigment formulation V is prepared like formulation I, except that 9 g of the reaction product, described in Example 10 of German Published Application DAS No. 1,767,822, of 3-dimethylaminopropylamine and phenyl isocyanate are used as the additive.

(b) Toluene-based gravure printing inks: gravure printing inks 1 and 3 are prepared with pigment formulations I to V according to (A1) and (A2). The comparative inks are prepared with the copper phthalocyanine pigment obtained according to Example 11(c), the products being inks 2 and 4.

The printing inks are tested according to (B). The test results are shown in Table 5 under Examples I to V.

TABLE 5

| Ex. | Bis-urea X [g] | R in structure NHCONHR / naphthalene / R—NH—CO—NH | Ink | Viscosity [sec] | Gloss PE film | Gloss aluminum foil |
|---|---|---|---|---|---|---|
| 11 | 8 | —(CH$_2$)$_3$—O—CH$_2$—CH(C$_2$H$_5$)—C$_4$H$_9$(n) | 1 | 18 | 69 | 107 |
|    |   |   | 2+ | 20 | 50 | 81 |
|    |   |   | 3 | 20 | 102 | 135 |
|    |   |   | 4+ | 54 | 76 | 113 |
| 12 | 9 | —(CH$_2$)$_3$—O—C$_{13}$H$_{27}$ | 1 | 18 | 82 | 115 |
|    |   |   | 2+ | 20 | 50 | 81 |
|    |   |   | 3 | 21 | 104 | 156 |
|    |   |   | 4+ | 54 | 76 | 113 |
| 13 | 8,5 | —(CH$_2$)$_3$—O—(C$_2$H$_4$O)$_2$—C$_4$H$_9$(n) | 1 | 19 | 95 | 133 |
|    |   |   | 2+ | 21 | 50 | 81 |
|    |   |   | 3 | 22 | 108 | 171 |
|    |   |   | 4+ | 54 | 76 | 113 |
| 14 | 9 | —C$_{13}$H$_{27}$ | 1 | 18 | 59 | 89 |
|    |   |   | 2+ | 21 | 50 | 81 |
|    |   |   | 3 | 20 | 96 | 145 |
|    |   |   | 4+ | 54 | 75 | 113 |
| 15 | 9 | —C$_{18}$H$_{35}$ (Oleyl) | 1 | 19 | 68 | 91 |
|    |   |   | 2+ | 19 | 69 | 85 |
|    |   |   | 3 | 22 | 100 | 141 |
|    |   |   | 4+ | 83 | 83 | 107 |
| I | 9 (prior art) | German Laid-Open Application DOS 2,701,292, Example A | 1 | 24 | 44 | 61 |
|    |   |   | 2+ | 20 | 52 | 76 |
|    |   |   | 3 | 101 | 72 | 100 |
|    |   |   | 4+ | 48 | 80 | 113 |
| II | 9 | German Laid-Open Application DOS 2,701,292, Example B | 1 | 24 | 48 | 68 |
|    |   |   | 2+ | 20 | 52 | 76 |
|    |   |   | 3 | 73 | 76 | 100 |
|    |   |   | 4+ | 48 | 80 | 113 |
| III | 9 | German Laid-Open Application DOS 2,701,292, Example D | 1 | 20 | 46 | 65 |
|    |   |   | 2+ | 20 | 52 | 76 |
|    |   |   | 3 | 48 | 70 | 98 |
|    |   |   | 4+ | 48 | 80 | 113 |
| IV | 9 | German Published Application DAS 1,767,822, Example 1 | 1 | 24 | 46 | 65 |
|    |   |   | 2+ | 19 | 55 | 78 |
|    |   |   | 3 | 60 | 68 | 88 |
|    |   |   | 4+ | 32 | 78 | 120 |
| V | 9 | German Published Application DAS 1,767,822, Example 10 | 1 | 28 | 57 | 80 |
|    |   |   | 2+ | 19 | 55 | 78 |
|    |   |   | 3 | 68 | 83 | 122 |
|    |   |   | 4+ | 32 | 78 | 120 |

+Comparison (without additive)

EXAMPLE 16

(a) The pigment formulation is prepared directly in the printing binder when preparing the ink.

(b) The toluene-based gravure printing inks are prepared according to (A1) and (A2), except that 12 g of the pigment obtained according to Example 11(c) and X g of the bis-urea shown in Table 6 are incorporated into the printing ink binder (the products obtained being inks 1 and 3).

The comparative inks 2 and 4 are prepared according to (A3) and (A4), using the pigment from Example 11(c). The toluene-based gravure printing inks were tested according to (B). The results are summarized in Table 6.

EXAMPLES 17 to 33

If instead of the bis-urea mentioned in Example 16 other bis-ureas shown in Table 6 and 7 below are used, printing inks having the properties shown in Table 6 are obtained.

TABLE 6

| Ex. | Bis-urea X [g] | R in structure NHCONHR / naphthalene / R—NH—CO—NH | Ink | Viscosity [sec] | Gloss PE film | Gloss aluminum foil |
|---|---|---|---|---|---|---|
| 16 | 0.96 (8%) | —(CH$_2$)$_3$—O—CH$_2$—CH(C$_2$H$_5$)—C$_4$H$_9$(n) | 1 | 16 | 89 | 129 |
|    |   |   | 2+ | 18 | 46 | 74 |
|    |   |   | 3 | 20 | 104 | 152 |
|    |   |   | 4+ | 37 | 69 | 102 |
| 17 | 1.02 (8,5%) | —(CH$_2$)$_3$—O—C$_{13}$H$_{27}$ | 1 | 19 | 102 | 147 |
|    |   |   | 2+ | 20 | 46 | 74 |
|    |   |   | 3 | 24 | 161 | 157 |
|    |   |   | 4+ | 37 | 69 | 102 |
| 18 | 1.08 (9%) | —(CH$_2$)$_3$—O—(C$_2$H$_4$O)$_2$—C$_4$H$_9$(n) | 1 | 20 | 52 | 68 |
|    |   |   | 2+ | 21 | 46 | 65 |
|    |   |   | 3 | 22 | 107 | 121 |

TABLE 6-continued

| Ex. | Bis-urea X [g] | R in R—NH—CO—NH— (naphthalene-1,5-diyl bis-urea, NHCONHR) | Ink | Viscosity [sec] | Gloss PE film | Gloss aluminum foil |
|---|---|---|---|---|---|---|
| | | | 4+ | 63 | 74 | 100 |
| 19 | 0.96 | —$C_{13}H_{27}$ | 1 | 19 | 79 | 104 |
| | | | 2+ | 24 | 67 | 92 |
| | | | 3 | 24 | 104 | 135 |
| | | | 4+ | 65 | 85 | 100 |
| 20 | 1.08 | —$C_{18}H_{35}$ (Oleyl) | 1 | 18 | 70 | 94 |
| | | | 2+ | 19 | 59 | 85 |
| | | | 3 | 23 | 106 | 144 |
| | | | 4+ | 53 | 83 | 107 |
| 21 | 1.02 | —$(CH_{12})_3$—O—$C_{9-11}H_{19-23}$ (mixture) | 1 | 15 | 65 | 96 |
| | | | 2+ | 19 | 46 | 61 |
| | | | 3 | 19 | 102 | 155 |
| | | | 4+ | 37 | 69 | 94 |
| 22 | 1.02 | —$(CH_2)_3$—O—$C_{10}H_{21}$ | 1 | 16 | 80 | 120 |
| | | | 2+ | 19 | 46 | 61 |
| | | | 3 | 22 | 106 | 150 |
| | | | 4+ | 37 | 69 | 94 |
| 23 | 1.08 | —$(CH_2)_3$—O—$C_{12-14}H_{25-29}$ (mixture) | 1 | 15 | 48 | 67 |
| | | | 2+ | 19 | 46 | 61 |
| | | | 3 | 19 | 100 | 156 |
| | | | 4+ | 37 | 69 | 94 |
| 24 | 1.02 | —$(CH_2)_3$—O—$C_{16-19}H_{33-39}$ (mixture) | 1 | 14 | 54 | 94 |
| | | | 2+ | 19 | 46 | 61 |
| | | | 3 | 19 | 109 | 142 |
| | | | 4+ | 37 | 69 | 94 |
| 25 | 0.96 | —$(CH_2)_3$—O—$C_{18}H_{37}$ | 1 | 21 | 86 | 98 |
| | | | 2+ | 19 | 46 | 61 |
| | | | 3 | 28 | 102 | 130 |
| | | | 4+ | 37 | 69 | 94 |
| 26 | 1.02 | —$(CH_2)_3$—O—$CH_2$—$CH_2$—O—$C_4H_9(n)$ | 1 | 19 | 52 | 68 |
| | | | 2+ | 19 | 46 | 65 |
| | | | 3 | 22 | 107 | 121 |
| | | | 4+ | 63 | 74 | 99 |
| 27 | 1.02 | —$(CH_2)_3$—O—$(C_2H_4O)_2$—$C_2H_5$ | 1 | 17 | 48 | 70 |
| | | | 2+ | 19 | 46 | 65 |
| | | | 3 | 22 | 102 | 130 |
| | | | 4+ | 63 | 74 | 99 |
| 28 | 1.02 | —$(CH_2)_3$—O—$(C_2H_4O)_2$—$C_6H_5$ | 1 | 18 | 48 | 85 |
| | | | 2+ | 19 | 46 | 65 |
| | | | 3 | 26 | 93 | 133 |
| | | | 4+ | 63 | 74 | 99 |
| 29 | 1.08 | —$(CH_2)_3$—O—$(C_2H_4O)_3$—$C_4H_9(n)$ | 1 | 21 | 104 | 150 |
| | | | 2+ | 20 | 55 | 87 |
| | | | 3 | 25 | 107 | 155 |
| | | | 4+ | 37 | 87 | 119 |
| VI | 1.08 (9%) | German Laid-Open Application DOS 2,701,292, Example A | 1 | 39 | 52 | 78 |
| | | | 2+ | 36 | 50 | 69 |
| | | | 3 | 203 | 74 | 98 |
| | | | 4+ | 180 | 80 | 106 |
| VII | 1.08 | German Laid-Open Application DOS 2,701,292, Example B | 1 | 50 | 50 | 76 |
| | | | 2+ | 36 | 50 | 69 |
| | | | 3 | 146 | 63 | 83 |
| | | | 4+ | 180 | 80 | 106 |
| VIII | 1.08 | German Laid-Open Application DOS 2,701,292, Example D | 1 | 36 | 48 | 74 |
| | | | 2+ | 36 | 50 | 69 |
| | | | 3 | 127 | 65 | 89 |
| | | | 4+ | 180 | 80 | 106 |
| IX | 1.08 | German Published Application DAS 1,767,822, Example 1 | 1 | 40 | 41 | 72 |
| | | | 2+ | 36 | 50 | 69 |
| | | | 3 | 181 | 54 | 91 |
| | | | 4+ | 180 | 80 | 106 |
| X | 1.08 | German Published Application DAS 1,767,822, Example 10 | 1 | 70 | 59 | 93 |
| | | | 2+ | 36 | 50 | 69 |
| | | | 3 | 235 | 70 | 102 |
| | | | 4+ | 180 | 80 | 106 |

+Comparison (without additive)

TABLE 7

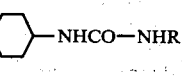

| Ex. | Bis-urea X [g] | R | Ink | Viscosity [sec] | Gloss PE film | Gloss aluminum foil |
|---|---|---|---|---|---|---|
| 30 | 1.02 (8.5%) | $-C_{13}H_{27}$ | 1 | 18 | 63 | 70 |
|  |  |  | 2+ | 18 | 52 | 74 |
|  |  |  | 3 | 20 | 89 | 131 |
|  |  |  | 4+ | 31 | 78 | 117 |
| 31 | 1.08 (9%) | $-(CH_2)_3-O-CH_2-CH(C_2H_5)-C_4H_9(n)$ | 1 | 17 | 57 | 80 |
|  |  |  | 2+ | 18 | 52 | 74 |
|  |  |  | 3 | 21 | 89 | 115 |
|  |  |  | 4+ | 31 | 78 | 117 |
| 32 | 0.96 (8%) | $-(CH_2)_3-O-C_{13}H_{27}$ | 1 | 16 | 107 | 154 |
|  |  |  | 2+ | 20 | 46 | 85 |
|  |  |  | 3 | 45 | 109 | 165 |
|  |  |  | 4+ | 80 | 72 | 99 |
| 33 | 0.96 | $-(CH_2)_3-O-(C_2H_4O)_2-C_4H_9(n)$ | 1 | 17 | 52 | 78 |
|  |  |  | 2+ | 18 | 50 | 71 |
|  |  |  | 3 | 20 | 83 | 120 |
|  |  |  | 4+ | 31 | 72 | 112 |

COMPARATIVE EXAMPLES VI TO X (PRIOR ART)

(b) The pigment formulations are prepared by incorporating 12 g of copper phthalocyanine pigment (prepared according to Example 11 (c)) and X g of one of the reaction products described in German Laid-Open Application DOS No. 2,701,292, Examples A, B and D and German Published Application DAS No. 1,767,822, Examples 1 and 10, directly into the printing ink binder when preparing a printing ink according to (A1) and (A2) (the products obtained in each case being identified as inks 1 and 3).

| Pigment formulation | X [g] | Reaction product from |
|---|---|---|
| VI | 1.08 | DOS 2,701,292 Ex. A |
| VII | 1.08 | DOS 2,701,292 Ex. B |
| VIII | 1.08 | DOS 2,701,292 Ex. D |
| IX | 1.08 | DAS 1,767,822 Ex. 1 |
| X | 1.09 | DAS 1,767,822 Ex. 10 |

The comparative inks 2 and 4 are prepared, according to (A3) and (A4), with the pigment obtained according to Example 11(c). The printing inks were tested according to (B). The results are summarized in Table 6, under Examples VI to X.

EXAMPLE 34

(a) Formulation: 100 g of the flavanthrone pigment prepared according to Example 1(c) are mixed homogeneously with 5 g of the bis-urea of the formula

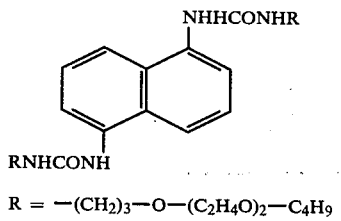

$R = -(CH_2)_3-O-(C_2H_4O)_2-C_4H_9$ (b) Baking finish: a full-shade finish and a white reduction are prepared as described under (C). For comparison, a full-shade finish and a white reduction are prepared with the pigment obtained according to Example 1.

(c). The colorations obtained with these finishes were tested, and assessed, according to (D).

The full-shade coloration obtained with the formulation according to the invention is somewhat lighter and substantially more transparent than that obtained with the comparative pigment. The white reduction shows a yellower hue, a color equivalent of 95, taking the value obtained with the comparative pigment as 100, and virtually the same purity of hue.

Virtually identical colorations are obtained if the formulation is prepared by grinding the pigment obtained according to Example 1(c) and the bis-urea directly in the baking finish.

EXAMPLE 35

The procedure followed is as described in Example 34, except that the pigment formulation contains 5%, based on flavanthrone pigment, of the bis-urea obtained from 1 mole of 1,5-naphthylene diisocyanate and 2 moles of 3-tridecyloxypropylamine.

Table 8 shows the evaluation of the resulting full-shade coloration and white reduction.

COMPARATIVE EXPERIMENTS XI TO XIII (PRIOR ART)

(a) The formulations are prepared according to Example 34(a), using the following additives, in each case in an amount of 5%, based on pigment.

| Formulation | Additive from |
|---|---|
| XI | DOS 2,701,292 Ex. B |
| XII | DOS 2,701,292 Ex. D |
| XIII | DAS 1,767,822 Ex. 10 |

(b) The baking finishes were prepared exactly as in Example 34(b), and the colorations were assessed according to (D). The results are shown in Table 8, in comparison with those of Examples 34 and 35.

TABLE 8.

Flavanthrone

| Example | X [g] | Additive | Coloration white reduction CE | T | S | Full shade Hue | Transparency |
|---|---|---|---|---|---|---|---|
| Comparison | 0 | — | 100 | 2.53 | 4.57 | | (Comparison) |
| 34 | 5 | 1,5-$C_{10}H_8$-[NHCONH—$(CH_2)_3$—O-$(C_2H_4O)_2$—$C_4H_9$]$_2$ | 95 | 2.45 | 4.59 | slightly lighter | substantially more transparent |
| XI | 5 | German Laid-Open Application DOS 2,701,292, Example B | 81 | 2.45 | 4.57 | | slightly more transparent than |
| XII | 5 | German Laid-Open Application DOS 2,701,292, Example D | 90 | 2.47 | 4.55 | as comparison | comparison |
| XIII | 5 | German Published Application DAS 1,767,822, Example 10 | 98 | 2.49 | 4.55 | | son |
| 35 | 5 | 1,5-$C_{10}H_8$-[—NHCONH—$(CH_2)_3$—O—$C_{13}H_{27}$]$_2$ | 68 | 2.38 | 4.56 | | substantially more transparent |

EXAMPLE 36

(a) The formulation is prepared in the binder.

(b) Baking finish: a colored finish is prepared, by incorporating 5 g of the milled material (indanthrone) described in Example 3(c) and 0.35 g of the bis-urea obtained from 1,5-naphthylene diisocyanate and 3-(2'-ethylhexyloxy)-propylamine into the binder solution, using method (C1). A full-shade finish and a white reduction are prepared from this colored finish by method (C2) and (C3).

The comparative colorations are prepared using the milled material from Example 3(c).

Coatings are prepared from the finishes by methods (D1) and (D2) and compared with the comparative colorations.

The results are summarized in Table 9.

COMPARATIVE EXAMPLES XIV TO XVI (PRIOR ART)

(a) The formulations were prepared by incorporating the pigment and additive into the binder solution as in Example 36(b) and were used to produce finishes from which colorations were prepared.

The following additives were used:

| Formulation | Additive from |
|---|---|
| XIV | German Laid-Open Application DOS 2,701,292, Example A |
| XV | German Laid-Open Application DOS 2,701,292, Example D |
| XVI | German Published Application DAS 1,767,822, Example 1 |

The amount of additive was 10%, based on pigment.

The colorations were compared with those obtained according to Example 36. The results are summarized in Table 9.

TABLE 9

Indanthrone

| Example | X [g] | Additive | Colorations white reduction CE | $\Delta T$ | $\Delta S$ | Full shade Hue | Transparent |
|---|---|---|---|---|---|---|---|
| Comparison | 0 | — | 100 | 16.92 | 3.15 | (Comparison) | |
| 36 | 0.35 | 1,5-$C_{10}H_8$—[NHCONH—$(CH_2)_3$—OCH$_2$—CH($C_2H_5$)—$C_4H_9$]$_2$ | 83 | 16.85 | 3.31 | glossier substantially more transparent | |
| XIV | 0.5 | German Laid-Open Application DOS 2,701,292, Example A | 116 | 16.99 | 3.16 | as Comparison | |
| XV | 0.5 | German Laid-Open Application DOS 2,701,292, Example D | 108 | 16.98 | 3.19 | as Comparison | |
| XVI | 0.5 | German Published Application DAS 1,767,822, Example 10 | 117 | 16.95 | 3.17 | as Comparison | |

EXAMPLE 37

(a) Formulation: 100 g of the perylimide pigment obtained according to (c) are homogeneously mixed with 5 g of the bis-urea 1,5—$C_{10}H_8$—[NHCONH—$(CH_2)_3$—O—$(CH_2$—$CH_2$—$O)_2C_4H_9$]$_2$ (b) Baking finish: the finishes are prepared according to (C) and the colorations according to (D1) and (D2).

The comparative colorations are prepared according to (D1) and (D2), using the pigment obtained according to (c).

The full-shade coloration obtained with the formulation according to the invention is somewhat lighter and somewhat more transparent than the Comparison.

The white reduction has a color equivalent of 92 (Comparison=100), with virtually the same hue and the same purity.

(c) 1,100 kg of crude perylene-3,4,9,10-tetracarboxylic acid diimide are milled for 30 hours at 80° C. in a 10 m$^3$ ball mill filled with 15.5 tons of iron balls of 20–25 mm $\phi$. The milled material is discharged and heated with a 3-fold amount by weight of phenol for 5 hours at 180° C. The mixture is then diluted with water and rendered alkaline with sodium hydroxide solution. The pigment is filtered off and washed neutral with warm water. It is then dried gently.

EXAMPLE 38

(a) The formulation is prepared by mixing the milled material, obtained according to (c), with the bis-urea in the binder.

(b) Baking finish: a colored finish is prepared according to (C1) by dispersing 5 g of the milled material obtained according to (c) and 0.45 of the bis-urea

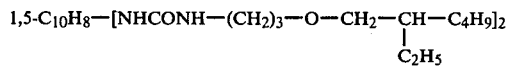

in 95 g of a baking finish based on a 35% strength solution of an alkyd/melamine resin in xylene.

From this finish, a full-shade finish and a white reduction are prepared according to (C2) and (C3), and baked coatings are produced from these according to (D1) and (D2) respectively.

The comparative colorations are prepared with the milled material (c) without adding the bis-urea.

The full-shade coloration is somewhat lighter and somewhat more transparent than the Comparison. The white reduction ($\Delta T = -0.37$, $\Delta S = +0.17$) is yellower, more brilliant, purer and more deeply colored than the Comparison (CE=77(Comparison=100)).

(c) 300 kg of crude perylene-2,4,9,10-tetracarboxylic acid N,N'-bis-methylimide (prepared by reacting perylene-tetracarboxylic acid dianhydride with methylamine) are milled for 30 hours in a 2 m$^3$ ball mill filled with 3 tons of iron balls of 20–25 mm $\phi$. The milled material is used directly.

more brilliant and substantially more deeply colored (CE=81) than the Comparison (=100).

(c) 200 kg of crude perylene-3,4,9,10-tetracarboxylic acid N,N'-bis-(4'-ethoxyphenylimide) are milled for 35 hours in a 2 m$^3$ ball mill, filled with 3 tons of iron balls of 20–25 mm $\phi$. The milled material is used directly.

EXAMPLES 40 to 47.

(a) The formulations are prepared by mixing the commercial pigments with 9%, based on pigment, of the bis-urea 1,5-$C_{10}H_8$—[NHCONH—($CH_2$)$_3$—O—$C_{13}H_{27}$]$_2$ in a coffee mill. The following pigments were used:

| Example | Pigment |
|---|---|
| 40 | prepared according to German Laid-Open Application DOS 2,357,077, Example 2 |
| 41 | nickel complex of 2,3-dihydroxyiminobutyric acid anilide |
| 42 | flavanthrone (Pigment Yellow 24; C.I. 70,600) |
| 43 | nickel complex of dihydroxyimino-butyric acid 2-anisidide |
| 44 | Pigment Red 178; C.I. 71,155 |
| 45 | Pigment Violet 19; C.I. 46,500 |
| 46 | Pigment Violet 23; C.I. 51,319 |
| 47 | Pigment Orange 43; C.I. 71,105 |

(b) Baking finishes: using formulation (a) and method (C), full-shade and white reduction baking finishes were prepared and the colorations were compared with those obtained with the pigments without addition of bis-urea. The tinctorial comparisons are summarized in Table 10.

TABLE 10

| | | Coloration white reduction | | | gloss of full shade coloration | |
|---|---|---|---|---|---|---|
| Example | Commercial pigment | CE | $\Delta T$ | $\Delta S$ | with additive | without additive (Comparison) |
| 40 | prepared according to German Laid-Open Application DOS 2,357,077, Example 2 | 95 | −0.09 | −0.02 | 76 | 70 |
| 41 | nickel complex of 2,3-dihydroxyimino-butyric acid anilide | 94 | −0.09 | +0.03 | 54 | 40 |
| 42 | flavanthrone | 95 | −0.04 | +0.02 | 100 | 70 |
| 43 | nickel complex of 2,3-dihydroxyimino-butyric acid 2-anisidide | 72 | −0.33 | +0.01 | 98 | 76 |
| 44 | Pigment Red 178; C.I. 71,155 | 100 | −0.01 | +0.01 | 93 | 83 |
| 45 | Pigment Violet 19; C.I. 46,500 | 86 | −0.01 | +0.05 | 94 | 87 |
| 46 | Pigment Violet 23; C.I. 51,319 | 100 | −0.11 | +0.10 | 93 | 76 |
| 47 | Pigment Orange 43; C.I. 71,105 | 84 | +0.09 | 0.06 | 93 | 46 |

CE of the Comparison in each case = 100

EXAMPLE 39

(a) Formulation: 100 g of the milled material described under (c) are milled (homogenized) with 9 g of the bis-urea

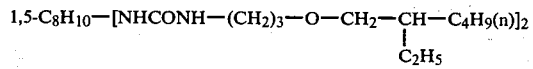

in a coffee mill.

(b) Baking finish: baked coatings are prepared from the formulation (a) according to (C).

The Comparisons are prepared according to (C) from the milled material (c).

The full-shade coloration is slightly darker and more transparent than the Comparison. The white reduction ($\Delta T = -0.3$, $\Delta S = +0.06$) is yellower, purer, somewhat

EXAMPLE 48

(a) Formulation: 100 g of copper phthalocyanine pigment (prepared according to Example 11(c)) and 9 g of the bis-urea

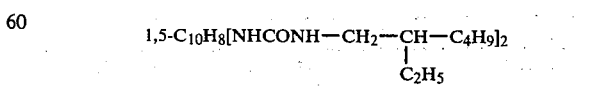

are mixed homogeneously in a coffee mill.

(b) Full-shade and white reduction baking finishes are prepared with (a) according to (C). The comparative colorations are prepared with the pigment obtained according to Example 11(c).

The test results on the coatings are shown in Table 11.

EXAMPLES 49 to 52

(a) The formulation is prepared as described in Example 48(a), except that the bis-ureas shown in Table 11, column 3, are used in an amount X.

(b) The baking finishes are prepared as described in Example 48(b).

The test results on the coatings are shown in Table 11.

COMPARATIVE EXAMPLES XVII to XX (PRIOR ART)

(a) The formulations were prepared as described in Example 48(a), except that the following additives were used:

| Formulation | Additive prepared according to |
|---|---|
| XVII | German Laid-Open Application DOS 2,701,292, Example A |
| XVIII | German Laid-Open Application DOS 2,701,292, Example B |
| XIX | German Published Application DAS 1,767,822, Example 1 |
| XX | German Published Application DAS 1,767,822, Example 10 |

The amount used was in each case 9 g, ie. 9% based on pigment.

(b) The baking finishes were prepared as described in Example 48(b).

The test results on the coatings are shown in Table 11.

The copper phthalocyanine pigment crystallized in the baking finish to give needles of length from 0.3 to 0.8 μm. By contrast, in the formulations of Examples 49 to 52 virtually no increase in particle size took place in the baking finish.

TABLE 11

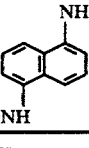

| | | | | | white reduction | | |
|---|---|---|---|---|---|---|---|
| Example | X [g] | Additive R = RNHCONH | | CE | ΔT relative to Comparison | ΔS | Coloration full shade |
| 48 | 9 | —CH$_2$—CH(C$_2$H$_5$)—C$_4$H$_9$ | | 98 | +0.02 | +0.07 | more transparent than Comparison |
| 49 | 9 | —C$_{13}$H$_{27}$ | | 86 | +0.05 | +0.16 | substantially more transparent than comparison |
| 50 | 9 | —(CH$_2$)$_3$—O—CH$_2$—CH(C$_2$H$_5$)—C$_4$H$_9$ | | 83 | +0.06 | +0.18 | |
| 51 | 9 | —(CH$_2$)$_3$—O—(CH$_2$—CH$_2$—O)$_2$—C$_4$H$_9$ | | 87 | +0.07 | +0.15 | |
| 52 | 9 | —(CH$_2$)$_3$—O—(CH$_2$—CH$_2$—O)$_3$—C$_4$H$_9$ | | 85 | +0.08 | +0.17 | |
| Comparison | 0 | — | | 100 | T = 17.73 | S = 4.22 | Comparison |
| XVII | 9 | German Laid-Open Application DOS 2,701,292, Example A | | 111 | +0.04 | +0.05 | slightly more transparent than Comparison — prior art |
| XVIII | 9 | German Laid-Open Application DOS 2,701,292, Example B | | 113 | +0.04 | +0.05 | |
| XIX | 9 | German Published Application DAS 1,767,822, Example 1 | | 105 | +0.06 | +0.09 | |
| XX | 9 | German Published Application DAS 1,767,822, Example 10 | | 110 | +0.04 | +0.03 | |

EXAMPLE 53

(a) The formulation is obtained by milling 300 g of crude copper phthalocyanine (prepared from o-phthalodinitrile and copper(I) chloride by the solvent method) and 15 g of the bis-urea 1,5—C$_{10}$H$_8$[NHCONH—(CH$_2$)$_3$—O—C$_{13}$H$_{27}$]$_2$ for 35 hours in a 5 liter ball mill, filled with 3 kg of iron balls of 20–30 mm φ, and rotating at about 55 rpm. The milled material is used directly.

(b) Baking finishes: using method (C1), (C3) and (D2), a white reduction is prepared and compared with the finish prepared from crude copper phthalocyanine which has been milled as described in (a), but in the absence of the bis-urea. In addition, the difficulty of dispersion of the formula (a) was determined by method (D3).

The results are shown in Table 12.

EXAMPLES 54 and 55

(a) The formulation is prepared as described in Example 53(a), except that the bis-urea is replaced by those shown in Table 12, column 3, which are used in amounts X.

(b) The baking finishes are prepared as described in Example 53(b).

The results obtained on the coatings are shown in Table 12.

TABLE 12

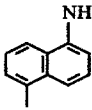

| Example | X [g] | Additive R = R—NHCONH | CE | white reduction T | S | dispersibility |
|---|---|---|---|---|---|---|
| 53 | 15 | —(CH$_2$)$_3$—O—C$_{13}$H$_{27}$ | 85 | +0.02 | +0.11 | 1 |

TABLE 12-continued

β-Copper phthalocyanine

| Example | X [g] | Additive R = R—NHCONH | 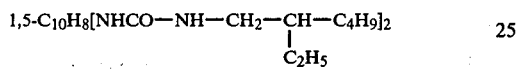 NHCONHR | Coloration CE | white reduction T | S | dispersibility |
|---|---|---|---|---|---|---|---|
| 54 | 15 (5%) | $-(CH_2)_3-O-CH_2-\underset{\underset{C_2H_5}{\mid}}{CH}-C_4H_9$ | | 82 | +0.03 | +0.13 | 3 |
| 55 | 27 (5%) | $-(C_{13}H_{27})$ | | 85 | +0.02 | +0.09 | 5 |
| Comparison | 0 (9%) | — | | 100 | T = 17.64 | S = 4.17 | 26 |

EXAMPLE 56

(a) Formulation: 100 g of copper phthalocyanine pigment (unstabilized α-modification) and 9 g of the bis-urea $$1,5\text{-}C_{10}H_8[NHCO-NH-CH_2-\underset{\underset{C_2H_5}{\mid}}{CH}-C_4H_9]_2$$

are mixed homogeneously.

(b) A white reduction is prepared with the resulting formulation according to methods (C1), (C3) and (D2).

For comparison, a white reduction is prepared from the copper phthalocyanine pigment, in the α-modification, used for (a).

(d) The formulation (a) and the α-copper phthalocyanine used to prepare the formulation (a) are additionally subjected to a toluene test. 1 g portions of the pigment, in 100 g of toluene, are kept at the reflux temperature of 110° C. for 2 hours. The pigment treated as described is isolated and the content of the α-modification is determined by X-ray methods. In addition, electron micrographs (at a magnification of 20,000) are taken of the treated pigment samples to obtain a picture of the crystal size.

The results are shown in Table 13. In this Table, the color equivalent CE is based on a value of 100 for the white reduction of the formulation of Example 62.

(c) Crude copper phthalocyanine (prepared from o-phthalodinitrile and copper(I) chloride in the presence of ammonia in nitrobenzene; chlorine content ≦0.1%) is dissolved, at room temperature, in an 8-fold amount by weight of 96% strength sulfuric acid, and the solution is poured out onto a mixture of water and ice. The pigment is filtered off, washed neutral, dried and milled to give a powder.

EXAMPLES 57 to 62

(a) The formulation is prepared by the method described in Example 56(a), except that 9 g of the bis-ureas listed in column 3 of Table 13 under Examples 57 to 62 are used.

(b) The white reductions are prepared as described in Example 56(b). The toluene test and its evaluation are carried out as in Example 56(b).

The results are shown in Table 13.

COMPARATIVE EXPERIMENTS XXI to XXIV (PRIOR ART)

(a) The formulations are prepared by the method described in Example 56(a), except that the bis-urea is replaced by various prior art additives, as shown below:

| Formulation | Additive prepared according to |
|---|---|
| XXI | German Laid-Open Application DOS 2,701,292, Example B |
| XXII | German Laid-Open Application DOS 2,701,292, Example D |
| XXIII | German Published Application DAS 1,767,822, Example 1 |
| XXIV | German Published Application DAS 1,767,822, Example 10 |

Amount used in each case: 9 g (=9%, based on pigment).

(b) The white reductions are prepared as described in Example 56(b). The toluene test and its evaluation are carried out as stated in Example 56(d).

The results are shown in Table 13.

TABLE 13

| Example | X [g] | Additive R = R—NH—CONH | NHCONHR | Coloration white reduction CE | T | S | toluene test content of α-modification [%] | crystal size [μm] |
|---|---|---|---|---|---|---|---|---|
| — | 0 | — | | 309 | 17.50 | 3.60 | 7 | 2-10 |
| 56 | 9 | $-CH_2-\underset{\underset{C_2H_5}{\mid}}{CH}-C_4H_9$ | | 92 | 17.29 | 4.06 | 94 | 0.1 |
| 57 | 9 | $-(CH_2)_3-O-CH_2-\underset{\underset{C_2H_5}{\mid}}{CH}-C_4H_9$ | | 93 | 17.30 | 4.08 | 91 | 0.1 |
| 58 | 9 | $-C_{13}H_{37}$ | | 99 | 17.28 | 4.01 | 90 | 0.1 |
| 59 | 9 | $-(CH_2)_3-O-C_{13}H_{27}$ | | 98 | 17.30 | 4.05 | 90 | 0.1 |

TABLE 13-continued

| Example | X [g] | Additive R = R—NH—CONH—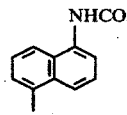—NHCONHR | Coloration white reduction CE T S | toluene test content of α-modification [%] | crystal size [μm] |
|---|---|---|---|---|---|
| 60 | 9 | —(CH$_2$)$_3$—O—C$_8$H$_{17}$(n) | 99  17.32  3.99 | 91 | 0.1 |
| 61 | 9 | —(CH$_2$)$_3$—O—C$_{10}$H$_{21}$(n) | 99  17.30  4.00 | 94 | 0.1 |
| 62 | 9 | —C$_{12}$H$_{25}$ (Vgl.) | 100  17.30  4.04 | 65 | 0.1–0.2 |
| XXI | 2 | German Laid-Open Application DOS 2,701,292, Example B | 121  17.43  4.03 | 12 | up to 10 μm |
| XXII | 2 | German Laid-Open Application DOS 2,701,292, Example D | 138  17.44  3.98 | 9 | up to 7 μm |
| XXIII | 1 | German Published Application DAS 1,767,822, Example 1 | 112  17.40  4.03 | 11 | up to 5 μm |
| XXIV | 1 | German Published Application DAS 1,767,822, Example 10 | 111  17.40  4.04 | 7 | up to 10 μm |

EXAMPLE 63

(a) Formulation: 400 g of hexadecachloro-copper phthalocyanine and 36 g of the bis-urea obtained by reacting 1 mole of 1,5-naphthylene diisocyanate with 2 moles of 3-(2'-ethylhexyloxy)-propylamine are milled for 24 hours in a 4 liter vibratory mill filled with 8 kg of iron balls of 25 mm φ.

(b) Full-shade colorations and white reduction colorations are prepared with formulation (a) according to (C) and (D).

For comparison, corresponding colorations are prepared from a material which has been obtained by milling as described in (a) in the absence of the bis-urea.

The results are shown in Table 14.

EXAMPLE 64

(a) Formulation: 400 g of polybromochloro-copper phthalocyanine (60% of Br and 7.9% of Cl) and 36 g of the bis-urea referred to in Example 63(a) are milled for 24 hours in the mill described in Example 63(a).

(b) Full-shade colorations and white reduction colorations are prepared, according to (C) and (D), with the mixture obtained in (a).

For comparison, corresponding colorations were prepared with a milled material obtained as described in (a), but without bis-urea.

The results are shown in Table 14.

We claim:
1. A pigment formulation which comprises
   (a) a finely divided organic pigment,
   (b) from 2 to 20% by weight, based on (a), of one or more urea derivatives of the formula

$$K(\!-\!NH\!-\!CO\!-\!NH\!-\!R)_2 \qquad (I)$$

where R is C$_{12}$–C$_{18}$-alkyl, C$_{12}$–C$_{18}$-alkenyl, C$_8$–C$_{18}$-alkoxypropyl or —(CH$_2$)$_3$—O—(C$_2$H$_4$O)-$_n$—R$^1$, where R$^1$ is C$_2$–C$_8$-alkyl or phenyl and n is 1, 2, 3 or 4, and K is 1,5-naphthylene or 4,4'-diphenylenemethane, and
   (c) from 0 to 5% by weight, based on (a+b), of conventional additives for pigment formulations.

2. A pigment formulation as claimed in claim 1, wherein K is 1,5-naphthylene.

3. A pigment formulation as claimed in claim 2, wherein R is C$_{13}$–C$_{18}$-alkyl, oleyl, 3-(C$_8$–C$_{18}$-alkoxy)-propyl or —(CH$_2$)$_3$—O—(C$_2$H$_4$O)$_m$—R$^7$, where m is 2 or 3 and R$^7$ is ethyl, n-propyl, n-butyl or phenyl.

4. A pigment formulation as claimed in claim 1 or 2, which contains from 5 to 15% by weight of (b), based on (a).

5. A pigment formulation as claimed in claim 3, which contains from 5 to 15% by weight of (b), based on (a).

6. A pigment formulation as claimed in claim 3, which contains from 7 to 10% by weight of (b), based on (a).

7. A pigment formulation as claimed in claim 1, wherein (a) is an organic pigment which is based on anthraquinone, on fused ring systems derived from anthraquinone, on perylene-3,4,9,10-tetracarboxylic acid or its diimide, on quinophthalone, on dioxazine, on quinacridone or on phthalocyanine.

8. A pigment formulation as claimed in claim 1, wherein (a) is flavanthrone, indanthrone, chlorinated indanthrone containing from 1 to 4 chlorine atoms, pyranthrone, dichloropyranthrone, monobromodi-

TABLE 14

| Example | X [g] | Polyhalogeno-copper phthalocyanine Additive R = RNHCONH—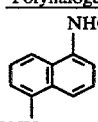—NHCONHR | CE | Coloration white reduction ΔT  ΔS relative to Comparison | full shade |
|---|---|---|---|---|---|
| Comparison 63 | 0 | — | 100 | T = 20.40   S = 4.43 | Comparison |
| 63 | 9 | —(CH$_2$)$_3$—O—CH$_2$—CH(C$_2$H$_5$)—C$_4$H$_9$ | 71 | −0.03   +0.18 (purer than Comparison) | substantially more transparent |
| Comparison 64 | 0 | — | 100 | T = 21.11   S = 4.69 | Comparison |
| 64 | 9 | —(CH$_2$)$_3$—O—CH$_2$—CH(C$_2$H$_5$)—C$_4$H$_9$ | 92 | −0.02   +0.16 (purer than Comparison) | more transparent | chloropyranthrone, dibromodichloropyranthrone, tetrabromopyranthrone, perylene-3,4,9,10-tetracarboxylic acid diimide, wherein the imide groups may be unsubstituted or substituted by $C_1$–$C_3$-alkyl or a phenyl or heterocyclic radical, and wherein the phenyl and heterocyclic radicals may additionally carry substituents which do not confer solubility in water, anthrapyrimidinecarboxylic acid amides, violanthrone, isoviolanthrone, dioxazine pigments, copper phthalocyanine which may contain up to 2 chlorine atoms per molecule, polychloro-copper phthalocyanine or polybromochloro-copper phthalocyanine containing up to 14 bromine atoms per molecule.

9. A pigment formulation which comprises
(a) a finely divided pigment selected from the group comprising flavanthrone, indanthrone, chlorinated indanthrone containing from 1 to 4 chlorine atoms, pyranthrone, dichloropyranthrone, monobromodichloropyranthrone, dibromodichloropyranthrone, tetrabromopyranthrone, perylene-3,4,9,10-tetracarboxylic acid diimide, wherein the imide groups may be unsubstituted or substituted by $C_1$–$C_3$-alkyl or a phenyl or heterocyclic radical, and wherein the phenyl and heterocyclic radicals may additionally carry substituents which do not confer solubility in water, anthrapyrimidinecarboxylic acid amides, violanthrone, isoviolanthrone, dioxazine pigments, copper phthalocyanine which may contain up to 2 chlorine atoms per molecule, polychloro-copper phthalocyanine or polybromochloro-copper phthalocyanine containing up to 14 bromine atoms per molecule and (b) from 2 to 20% by weight, based on (a), of one or more urea derivatives of the formula

K$+$NH—CO—NH—R$)_2$ where R is $C_{13}$–$C_{18}$-alkyl, oleyl, 3-($C_8$–$C_{18}$-alkoxy)-propyl or —$(CH_2)_3$—O—$(C_2H_4O)_m$—R$^7$, m is 2 or 3, R$^7$ is ethyl, n-propyl, n-butyl or phenyl and K is 1,5-naphthylene.

10. A pigment formulation as claimed in claim 9, wherein R in the formula shown in tridecyl, 3-(2'-ethylhexyloxy)-propyl or —$(CH_2)_3$—O—$(C_2H_4O)_2$—$C_4H_9$.

11. A formulation as claimed in claim 9 or 10, which contains from 5 to 15% of (b), based on (a).

12. A formulation as claimed in claim 9 or 10, which contains from 7 to 10% of (b), based on (a).

13. A pigment formulation which contains
(a) from 2 to 20% by weight, based on (a), of one or more urea derivatives of the formula

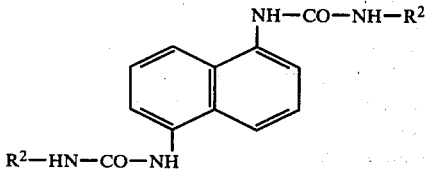

where R$^2$ is $C_8$–$C_{10}$-alkyl, $C_{13}$–$C_{18}$-alkyl or 3-($C_8$–$C_{18}$-alkoxy)-propyl.

14. A pigment formulation as claimed in claim 13, which contains from 5 to 15% by weight of (b), based on (a).

* * * * *

UNITED STATES PATENT AND TRADEMARK OFFICE
CERTIFICATE OF CORRECTION

PATENT NO. : 4,255,203

DATED : March 10, 1981

INVENTOR(S) : JOACHIM KRANZ ET AL

It is certified that error appears in the above—identified patent and that said Letters Patent is hereby corrected as shown below:

Please insert the following Foreign Application Priority Data:

[30]--Foreign Application Priority Data

Feb. 17, 1979   Fed. Rep. of Germany..........2906111

Signed and Sealed this

Nineteenth Day of May 1981

[SEAL]

Attest:

RENE D. TEGTMEYER

Attesting Officer

Acting Commissioner of Patents and Trademarks